Sept. 11, 1945.　　　B. MOONEY ET AL　　　2,384,763
PEANUT DIGGER AND SHAKER
Filed Jan. 5, 1944　　　4 Sheets-Sheet 1
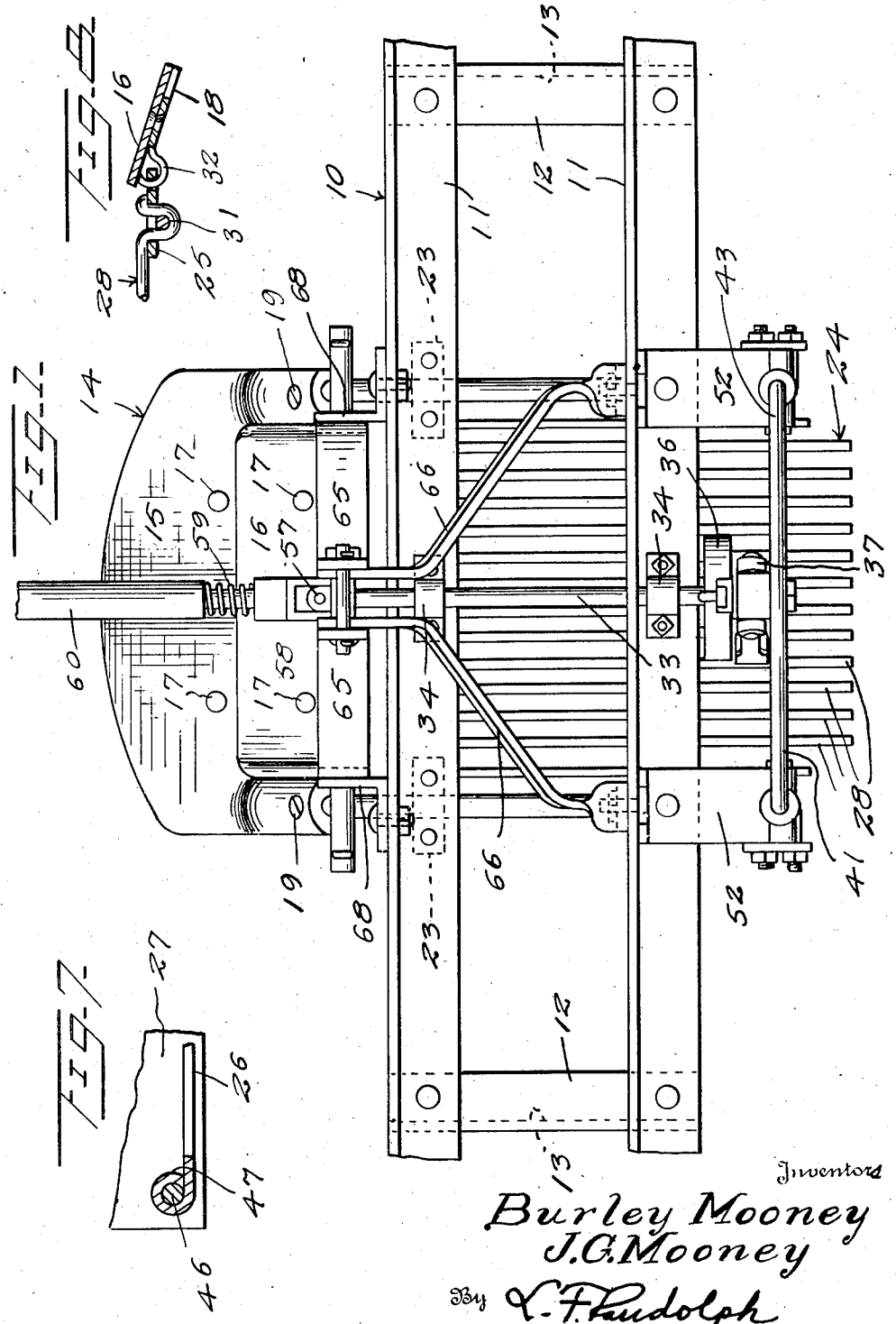
Inventors
Burley Mooney
J.G. Mooney
By L.F. Rudolph
Attorney

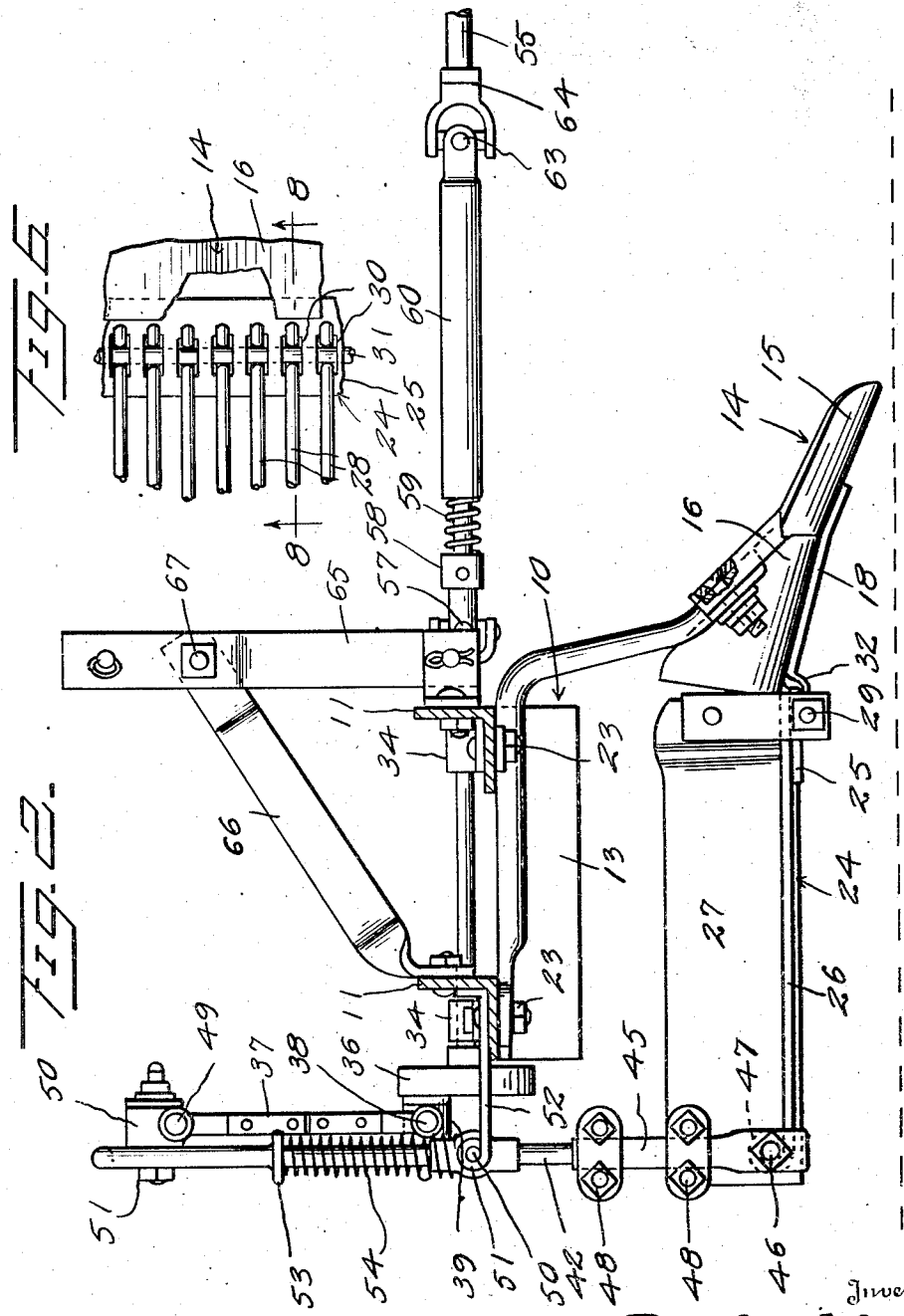

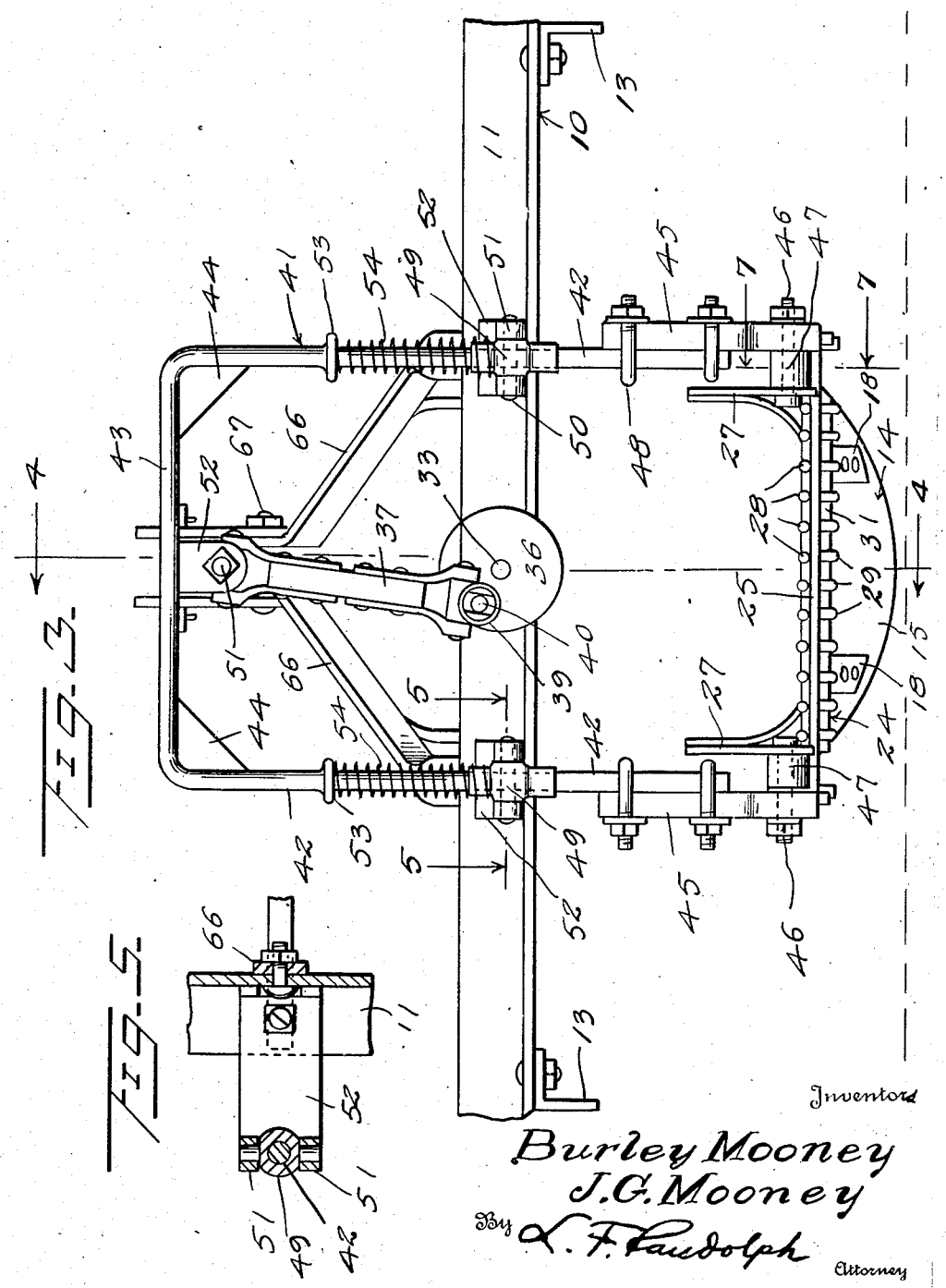

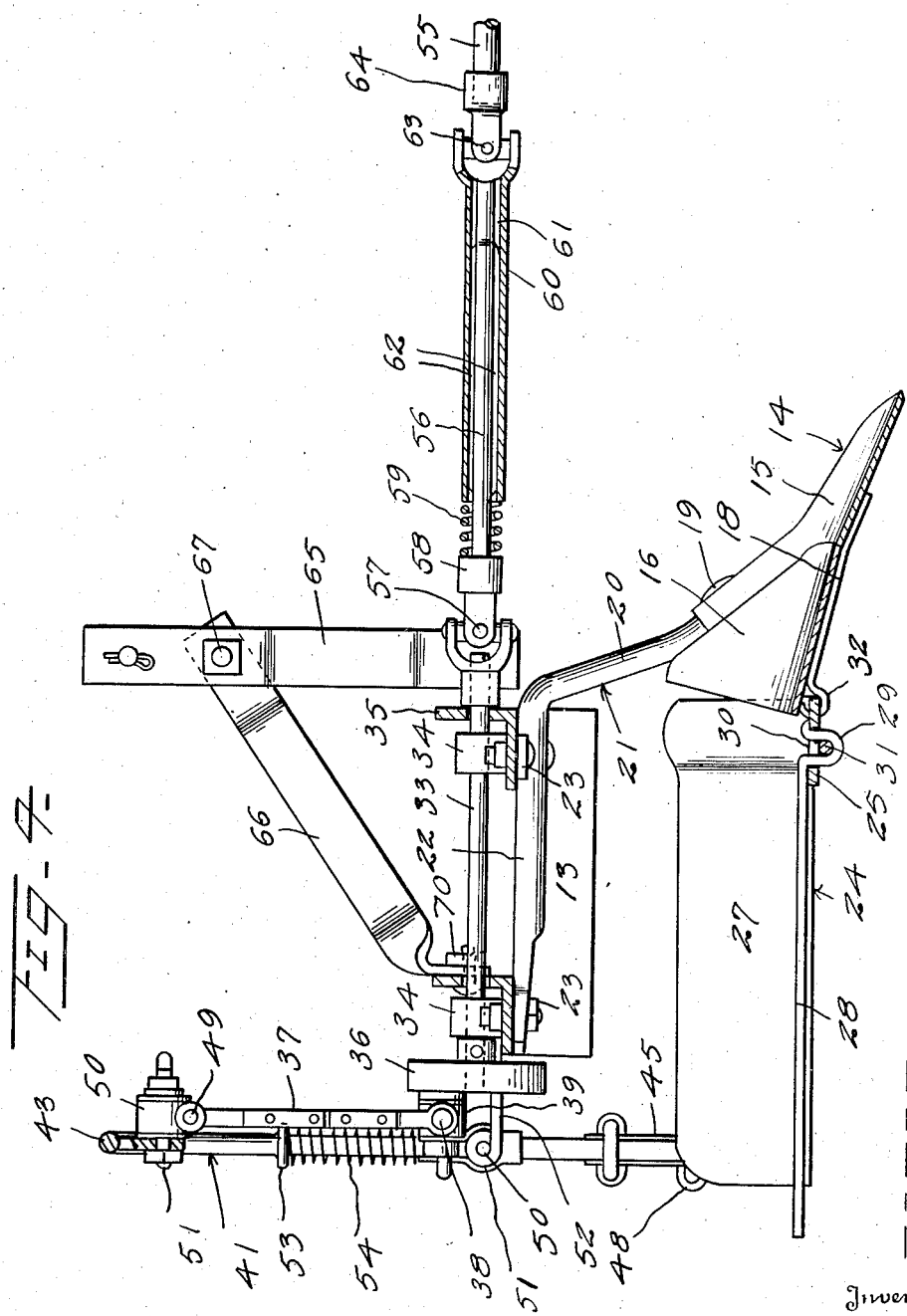

Patented Sept. 11, 1945

2,384,763

UNITED STATES PATENT OFFICE 2,384,763

PEANUT DIGGER AND SHAKER

Burley Mooney and Jess G. Mooney, Stonewall, Okla., assignors to Turner Manufacturing Company, Statesville, N. C., a corporation of North Carolina Application January 5, 1944, Serial No. 517,086

4 Claims. (Cl. 55—141)

This invention relates to a machine having means to plow or dig peanuts and to shake them to thoroughly sift and remove dirt therefrom, and thereafter deposit them on the ground for gathering in any suitable manner.

It is further aimed to provide a structure capable of mounting on a tractor or horse-drawn vehicle in which is employed novel gearing to effect the shaking and/or vibration of the dug peanuts.

Still further, it is aimed to provide a novel coupling whereby the structure may be operatively connected or disconnected from the power take-off shaft of a tractor or the like.

The more specific objects and advantages will become apparent from a consideration of the description following taken in connection with accompanying drawings illustrating an operative embodiment.

In said drawings:

Figure 1 is a top or plan view;

Figure 2 is a view primarily in side elevation, but with certain parts shown in section;

Figure 3 is a rear elevation;

Figure 4 is a vertical section taken on the line 4—4 of Figure 3;

Figure 5 is a sectional detail taken on the line 5—5 of Figure 3;

Figure 6 is a fragmentary plan view of the sifter means;

Figure 7 is a detail section taken on the line 7—7 of Figure 3; and

Figure 8 is a detail section taken on the line 8—8 of Figure 6.

Referring specifically to the drawings wherein like reference characters designate like or similar parts, I provide a suitable frame generally designated 10 which is adapted to be bolted, clamped or otherwise rigidly fastened on a suitable tractor, horse-drawn vehicle or otherwise. This frame may consist of a pair of spaced parallel beams 11 which in use are disposed transverse with respect to the direction of travel. Beams 11 are connected by cross bars 12 which may have depending flanges at 13 to rest directly on the tractor or other vehicle upon which the structure is mounted.

Rigid with respect to the frame 10 and suitably supported therefrom is a somewhat arcuate plow or shovel 14 adapted for penetration into the soil beneath the peanuts in order to dig them. Plow 14 may be in one piece, or in two sections such as 15 and 16, which are connected together by riveting them as at 17 to hinged straps 18, and they are also detachably bolted or otherwise fastened as at 19 to downwardly curving portions 20 of mounting bars 21 having horizontal portions 22 suitably bolted as at 23 to the beams 11.

Directly behind the plow 14 so as to receive the peanuts therefrom is a sifter generally designated 24. This sifter may have at the base thereof a frame comprising a forward plate 25 and side plates 26 extending rearwardly therefrom, and suitably mounted on the sifter and extending vertically from the side plates 26 are fenders 27 to confine the peanuts between them and on sifter rods 28. The sifter rods are preferably parallel and may be spaced any desired distance apart. Also, they may be attached in any approved manner to the plate 25. For instance, they have U-shaped portions 29 which partly occupy slots 30 in the plates 25 and below the same a fastening rod 31 is passed through the U-shaped portions and permanently or removably but tightly fastened in place so that the tines 28 will be operatively positioned.

It will be noted that the straps 18 have arcuate portions 32 passing through openings in the forward portion of the plate 25 so as to hinge the plow 14 at the rear thereof to the sifter structure. The rear end of the sifter structure is adapted to be raised and lowered continuously during operation so that dirt from the peanuts dug by the plow 14 passing from the same over the tines, will be shaken or vibrated and the dirt adhering thereto will be dislodged and sifted therefrom, falling back onto the ground between the tines, and the peanuts after sifting thereof, will be discharged from the sifter at the rear end onto the ground, into receptacles or in any preferred manner or way.

An operating shaft 33 is journaled midway of the frame 10 crosswise of the beams 11 and in the direction of draft, in suitable bearings 34 mounted on said beams 11. Shaft 33 also passes through suitable openings 35 in said beams 11 and at the rear end has a disc or eccentric 36 fastened thereon. Disc 36 operates a vertically disposed connecting rod 37 which is pivotally connected at 38 to a sleeve 39 journaled on an eccentric stud 40 on the disc or eccentric 36, thus enabling the connecting rod 37 to move on axes at right angles to each other at the connection to the disc 36.

A U-shaped frame 41 is vertically disposed behind the beams 11 and it has vertical legs 42 and a crossbar 43 at the top strengthened by means of webs 44 in the angles. Legs 42 are sectional in that they have seats 45 which are pivotally connected to the sifter as by means of bolts 46 passing through the fenders 27 and sleeves 47 formed by curling the rear ends of the bars 26. The sections 42 and 45 are adjustably secured together as by means of U-bolts 48. In this manner, depth of the rear end of the sifter may be regulated and accordingly the throw or movement of the same in shaking and sifting the peanuts will be regulated.

The legs 42 slide in vertical bearings 49 having lateral studs 50 which are pivotally mounted in sleeve 51 formed at the rear ends of brackets 52 which are fastened to one of the beams 11. Enlargements 53 are formed in the legs 42 above the beams 11 and compression springs 54 surround the legs, abutting against the enlargements 53 at one end and against the bearings 49 at the other end.

The aforesaid pitman 37 or connecting rod is connected to the bridge 43 of the U-shaped frame 41 for movement on axes at right angles to each other similar to the connection of such pitman to the discs 36. To this end, the upper end of the pitman is pivoted to studs 49 on a bearing or ring 50 which in turn is pivoted or journaled on a bolt 51 mounted by a bracket 52 suitably connected to the bridge 53 of frame 41.

The operating shaft 33 is adapted to be rotated from any suitable source of power as from an engine mounted on the vehicle in case the latter is horse-drawn, but is preferably operable from a power take-off shaft 55 on the tractor, when my improvement is mounted on and carried by a tractor.

Novel means is provided to effect the coupling between the shaft 33 and the power take-off shaft 55. To this end, shaft 33 may be sectional in that it has a section 56 connected to the remainder thereof by a universal joint as at 57 forwardly of the beam 11. Shaft 56 has an enlargement 58 thereon, abutted by an expansive coil spring 59 surrounding the adjacent portion of the shaft 56. Detachably and slidably mounted on the shaft 56 is a coupling shaft 60. The latter has keyways 61 longitudinally thereof which are fitted by keys 62 disposed radially along the shaft 56. In this manner, the coupling 60 is slidable as well as rotatable with the shaft 56. Such coupling section 60 includes a universal joint at 63 which connects socket 64 thereto and which socket has a rectangular or other suitably shaped recess in order to detachably receive the correspondingly shaped end of the power take-off shaft 55, so that the latter through the different shafts and connections mentioned, will drive the shaft 33, the pitman 37 through its eccentric connection to the disc 36, and effect the raising and lowering of the frame 41 so as to correspondingly raise and lower the sifter 24 at its rear end, moving it at its hinged connection at 32 with the plow, thus effectively shaking and dislodging dirt from the peanuts as they pass over the sifter.

It will be clear that when the apparatus is not to be operated, although still carried by the tractor, that coupling 60 may be pressed rearwardly against the spring 59 in order to detach the coupling 64 from the power take-off shaft 55 and such coupling and section 56 swung laterally at the universal joint 57 and the coupling 60 detached from the section 56 by sliding movement. In this manner, the coupling 60 is readily attachable or detachable as desired.

The frame is preferably braced by means of vertical bracket members 65 and diagonal bracket members 66, secured together as by bolting as at 67 and respectively fastened to the frame 10 at brackets 68 thereon, and by means of bolts 70.

Various changes may be resorted to provided they fall within the spirit and scope of the invention.

We claim as our invention:

1. A machine of the class described having a frame, a plow carried by said frame, a sifter hinged in the rear of the plow to receive the product dug by the latter, means mounted on the frame operable to shake the sifter comprising a second frame attached to the sifter, a driven shaft on the first frame, an eccentric on said shaft and connected to the second frame bearings on the frame in which the second-mentioned frame slides, said second-mentioned frame having adjustable parts to enable variation in the throw of the sifter.

2. A peanut digger and shaker comprising a rigid frame adapted to be secured to the rear of a tractor, a pair of downwardly and forwardly projecting members carried by the frame, a plow carried by the members and having upturned side portions, a sifter having its forward end pivotally secured to the rear end of the plow and having vertically disposed fenders at each side thereof, a pair of bearings pivoted on transverse horizontal axes at the rear of the frame, an inverted U-shaped member having its legs slidably mounted in the bearings and having the lower ends of the legs pivotally secured to the rear end of the sifter at the sides thereof, a driven rotary shaft mounted in the frame and having an eccentric thereon, a connecting rod having its ends universally connected to the eccentric and to the upper portion of the U-shaped member, and resilient means for normally urging the U-shaped member upwardly.

3. A peanut digger and shaker comprising a framework adapted to be secured to a tractor and the like, a plow supported by the framework, a sifter pivotally secured to the rear end of the plow, an inverted U-shaped member mounted for vertical sliding movement in the frame and having the lower ends of the legs thereof pivotally secured to the rear portion of the sifter, a driven shaft rotatably mounted in the frame and having an eccentric fixed thereon, a connection between the eccentric and the U-shaped member whereby rotation of the shaft will impart up and down movement to the U-shaped member and the sifter.

4. A peanut digger and shaker comprising a framework adapted to be secured to a tractor and the like, a plow supported by the framework, a sifter pivotally secured to the rear end of the plow, an inverted U-shaped member mounted for vertical sliding movement in the frame and having the lower ends of the legs thereof pivotally secured to the rear portion of the sifter, a driven shaft rotatably mounted in the frame and having an eccentric fixed thereon, a connection between the eccentric and the U-shaped member whereby rotation of the shaft will impart up and down movement to the U-shaped member and the sifter, and resilient means normally urging the U-shaped member upwardly relative to the frame.

BURLEY MOONEY.
JESS G. MOONEY.